Oct. 11, 1932.  H. W. LEWIS  1,882,222
TRANSMISSION
Filed Sept. 9, 1930   4 Sheets-Sheet 1

INVENTOR.
Howard W. Lewis
BY
ATTORNEYS.

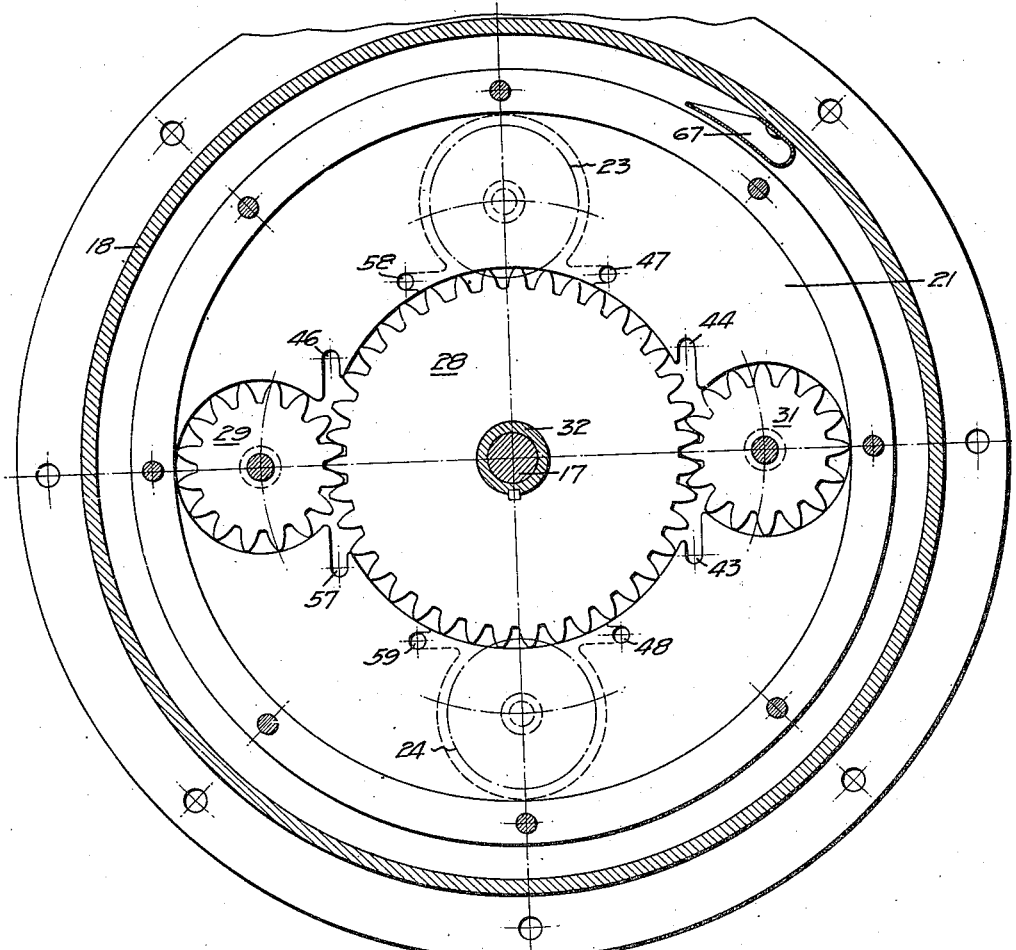
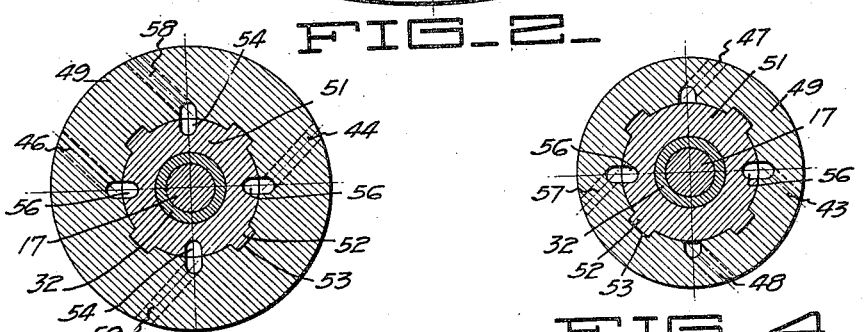

Oct. 11, 1932.  H. W. LEWIS  1,882,222
TRANSMISSION
Filed Sept. 9, 1930  4 Sheets-Sheet 3
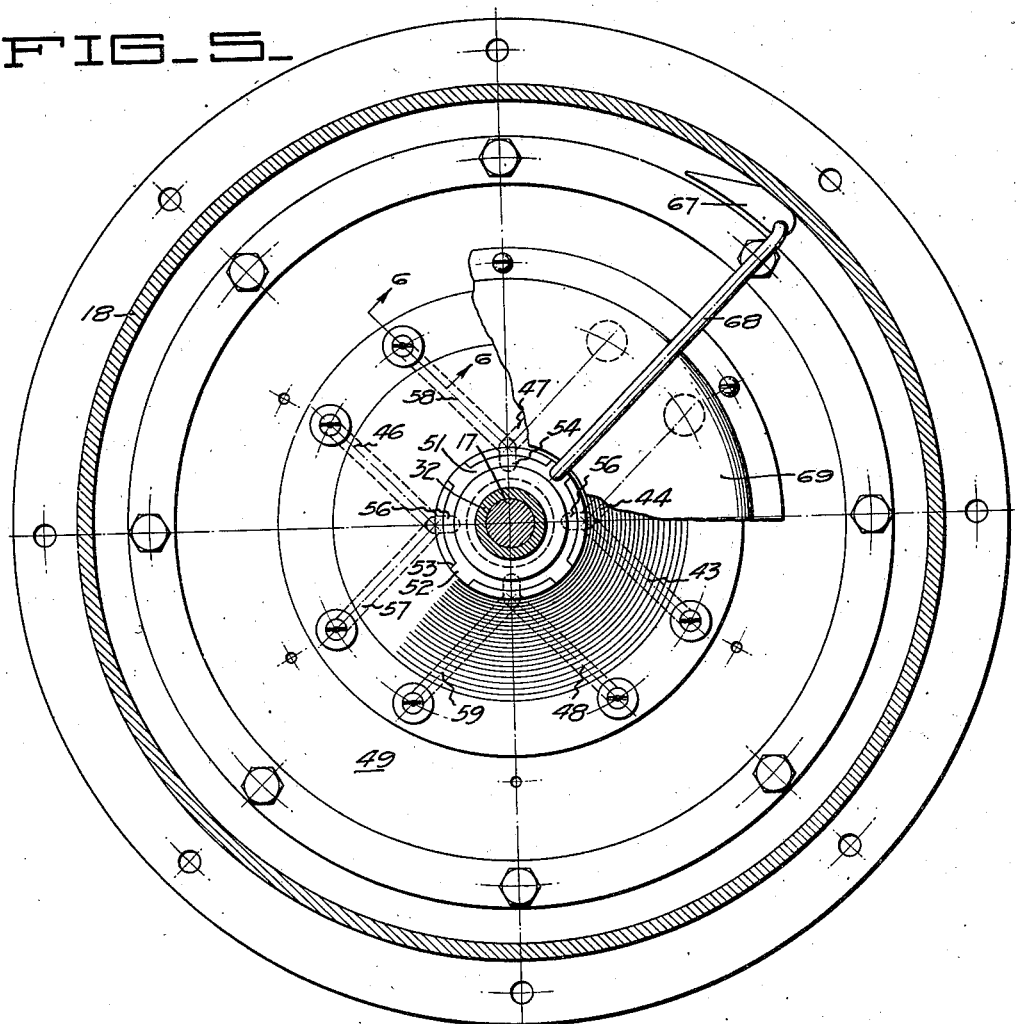
FIG_5_
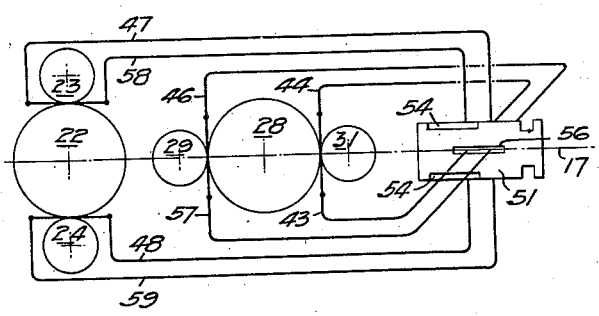
FIG_7_
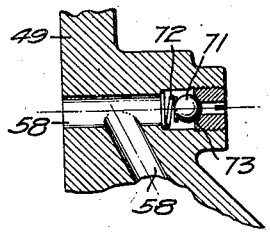
FIG_6_
INVENTOR.
Howard W. Lewis
BY White, Prost, Fehr & Lothrop
ATTORNEYS.

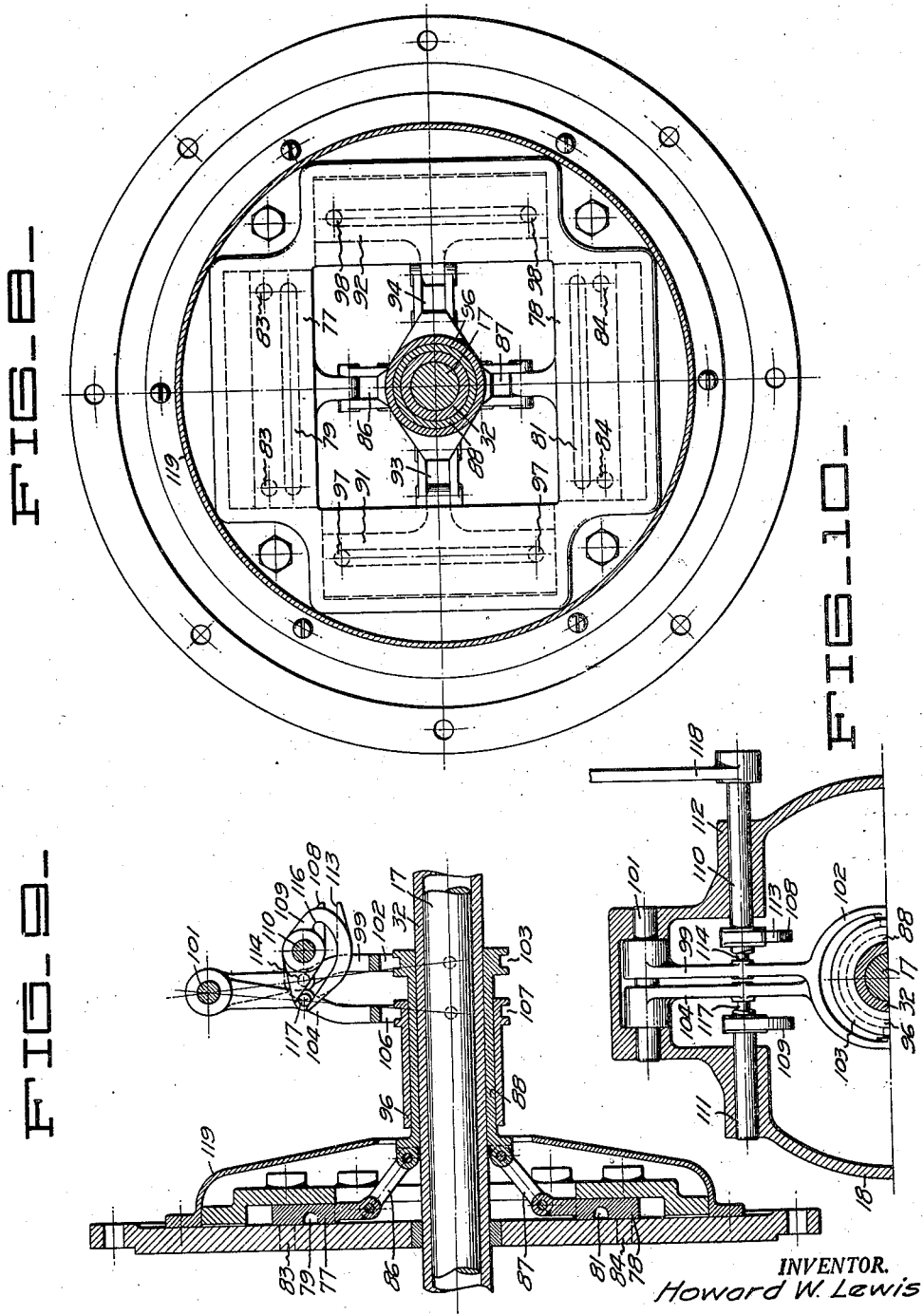

Patented Oct. 11, 1932

1,882,222

UNITED STATES PATENT OFFICE

HOWARD W. LEWIS, OF SAN FRANCISCO, CALIFORNIA

TRANSMISSION

Application filed September 9, 1930. Serial No. 480,708.

This invention relates to transmissions and is particularly applicable to transmissions in which the speed ratio between a driving element and a driven element can be varied.

In transmissions commonly employed in automobiles and the like a gear train is provided for coupling a driving shaft with a driven shaft and at least one gear of the gear train is so arranged that it can be replaced by another gear of different size to change the speed ratio between the shafts. In transmissions of this type it is necessary to remove at least one gear of the gear train out of meshing engagement with the remaining gears and to substitute another gear of different size for the removed gear whenever it is desired to change the speed ratio.

To change the direction of rotation of the driven shaft it is necessary to change the number of gears in the train. Each time a change is made in the transmission the coupling between the driving shaft and the driven shaft must be made inoperative, thus necessitating a clutch or its equivalent in the transmission.

The operator of an automobile having a transmission of this type must be constantly alert during the shifting of gears on account of the relatively large number of operations required. While the operator is preoccupied with the manipulation of the shift lever and the clutch pedal he must steer the automobile with one hand and although one foot is free to operate the brakes of the vehicle, there is no way to accelerate the speed of the vehicle while the gears are in neutral position or while the clutch is disengaged. This inability to accelerate while shifting gears increases traffic congestion and is sometimes the direct cause of an accident.

Transmissions of this type are comparatively expensive to manufacture. The clutch faces are subject to wear and the teeth of the movable gear are sometimes stripped thereby making the upkeep high. Perhaps the most serious objection, however, is the inconvenience of shifting and the noise attendant upon the shifting operation.

My invention has for its main object the elimination of the disadvantages mentioned.

In its preferred form the invention comprises a transmission in which all of the gears of a gear train are constantly in meshing engagement. No shifting of gears is necessary to change the speed ratio between the driving and driven shafts or to change the direction of rotation of the driven shaft. No clutch is required and the number of parts in the transmission is reduced to a minimum.

A further object is to provide a transmission in which the speed ratio can be varied gradually throughout the range between its limiting values.

Another object is to provide a transmission in which the speed ratio can be varied without uncoupling the driving and driven shafts.

A still further object is to provide a transmission which is relatively silent at all times.

A still further object is to provide a transmission in which the speed ratio can be easily and conveniently changed with a minimum of manual operations.

Another object is to provide a transmission which is reliable and practical and which is economical to manufacture.

These and other objects are attained in the embodiment of the invention illustrated in the accompanying drawings in which:

Fig. 2 is a cross section taken on the line 2—2 of Fig. 1.

Fig. 3 is a cross section taken on the line 3—3 of Fig. 1.

Fig. 4 is a cross section taken on line 4—4 of Fig. 1.

Fig. 5 is a cross section taken on line 5—5 of Fig. 1, with parts of the device broken away.

Fig. 6 is a cross section taken on line 6—6 of Fig. 5.

Fig. 7 is a diagrammatic view of certain fluid conduits utilized in a preferred form of the invention.

Fig. 8 is an elevational view similar to Fig. 5 of a modification of certain valves employed to control the flow of fluid in the fluid conduits.

Fig. 9 is a vertical cross section of the valve shown in Fig. 8 and illustrates also one form of actuating mechanism for the valves.

Fig. 10 is a front elevational view of the valve actuating mechanism shown in Fig. 9.

Figure 1:
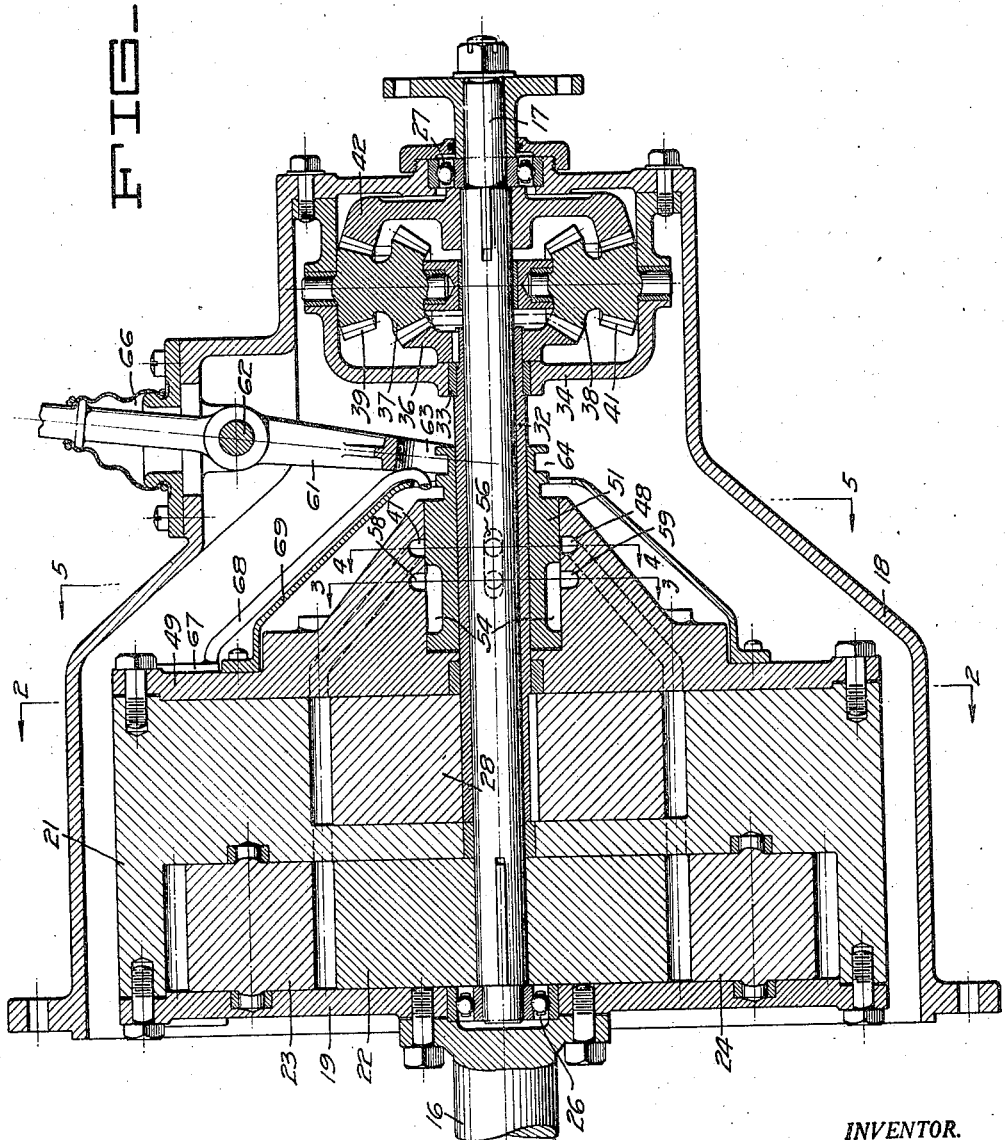
Fig. 1 is a vertical longitudinal cross section of a transmission incorporating the features of this invention.

In its preferred form the transmission of this invention comprises a pair of gear trains interconnecting a driving shaft and a driven shaft, one of said gear trains tending to rotate the driven shaft in one direction and the other of said gear trains tending to rotate the driven shaft in the opposite direction. Means are provided for disabling the coupling effect of each of the gear trains whereby either one of the gear trains can control the movement of the driven shaft while the other gear train idles.

Preferably, the disabling means of the separate gear trains are relatively complementary to one another, that is, the increase in the degree of idleness of one gear train is accompanied by a corresponding increase in effectiveness of the other gear train. When one gear train is exclusively effective the driven shaft rotates at its highest velocity as compared with the driving shaft in a certain direction, say clockwise, and when the other gear train is exclusively effective the driven shaft rotates at its maximum relative velocity in the other direction, or counterclockwise. The effectiveness of the gear trains can be varied gradually in complementary relationship to one another by the control means so that for intermediate settings of the same the velocity of the driven shaft can be varied from maximum in one direction down to zero velocity and up to maximum velocity in the other direction.

Referring now to the drawings I have shown a driving shaft 16 and a driven shaft 17 and interconnecting these shafts are a plurality of gears mounted in a housing 18. Rigidly secured to shaft 16 to rotate therewith is a plate 19 and plate 19 is in turn connected to a block 21 mounted for rotational movement within housing 18. Interconnecting block 21 and shaft 17 is an epicyclic gear train comprising a sun gear 22 and a pair of planet gears 23 and 24. Suitable recesses are formed in block 21 for the reception of gears 22, 23 and 24 and gears 23 and 24 are journaled in bearings supported by block 21 and plate 19 for normally idle rotation within their respective recesses. Gear 22 is keyed to shaft 17 and meshes with gears 23 and 24. Upon rotation of shaft 16, plate 19 and block 21 rotate therewith and gears 23 and 24 are carried around by block 21. Assuming that planet gears 23 and 24 are unrestrained and are free to rotate in their respective bearings, these gears will roll idly along the periphery of gear 22 without imparting rotational movement to gear 22 and shaft 17 therefore will remain stationary. If, however, planet gears 23 and 24 are locked against rotation, gear 22 will be rotated with block 21. Similarly, if gears 23 and 24 are only partly restrained against rotation, gear 22 will rotate at an intermediate velocity. Shaft 17 is journaled in suitable bearings 26 and 27 which permit relative rotation of shaft 17 with respect to shaft 16 and plate 19.

A second epicyclic gear train is disposed within recesses in block 21 and comprises a sun gear 28 and a pair of planet gears 29 and 31. Planet gears 29 and 31 are mounted in bearings in block 21 in a manner similar to the manner in which gears 23 and 24 are mounted and their action on sun gear 28 is similar to that which has been explained in connection with the first epicyclic gear train. Gear 28 is keyed to a sleeve 32 surrounding shaft 17 having a bearing 33 journaled in one wall of a gear housing 34. Sleeve 32 extends within housing 34 and has keyed thereon a gear 36 which meshes with a pair of idler pinions 37 and 38. Formed integrally with pinions 37 and 38 are pinions 39 and 41 respectively which are in meshing engagement with a gear 42 which is fixed on shaft 17.

The gears mounted in housing 34 constitute a reversing reduction gear train and shaft 17 is rotated in the reverse direction by gear 28 as compared with the direction of rotation imparted to it by gear 22. Motion is transmitted from gear 28, through sleeve 32, gear 36, pinions 37 and 38, pinions 39 and 41, gear 42 and shaft 17. Assuming that block 21 is rotating in a clockwise direction, as viewed from the right in Fig. 1, and that planet gears 23 and 24 are locked against rotation, gear 22 will be rotated in a clockwise direction carrying shaft 17 with it, gear 42 will be rotated in a clockwise direction and thru pinions 39, 41 and 37, 38 gear 36 will be rotated in a counterclockwise direction, carrying with it sleeve 32 and gear 28. Gear 28, therefore, will rotate in a counterclockwise direction within block 21 which is rotating in a clockwise direction and planet gears 29 and 31 will roll idly about the periphery of gear 28. When planet gears 23 and 24 are free to rotate, however, and planet gears 29 and 31 are locked against rotation, shaft 17 will be rotated by gear 28 in a counterclockwise direction upon clockwise rotation of block 21 and gear 22 will rotate in a counterclockwise direction with planet gears 23 and 24 rolling idly on its surface.

Thus, shaft 17 can be rotated in either a clockwise or a counterclockwise direction by locking planet gears 23 and 24 against rotation or by locking planet gears 29 and 31. When planet gears 23 and 24 are only partially restrained against rotation and planet gears 29 and 31 are also only partially restrained, each of the epicyclic gear trains will have its individual effect on the rotational movement of shaft 17 and the rotation imparted to shaft 17 will be the resultant motion derived from the two epicyclic gear trains.

If the effective couplings of the two gear trains are equal and opposite, shaft 17 will remain stationary. If the coupling effect of one of the gear trains is increased or decreased relative to the coupling effect of the other gear train, the rotation of shaft 17 will be varied accordingly.

For restraining the rotation of planet gears 29 and 31 and planet gears 23 and 24 relative to their respective sun gears, hydraulic means is employed and I have shown in Fig. 2 a fluid conduit 43 which opens into the contacting surfaces of gears 31 and 28 and a similar conduit 44 leading away from these surfaces. Conduits 43 and 44 are part of a fluid circuit and are adapted to be filled with a suitable incompressible fluid, such as oil. When the oil in the circuit which includes conduits 43 and 44 is free to circulate, relative rotation between gears 31 and 28 causes displacement of oil in the line. If, for example, block 21 is rotated in a clockwise direction, as viewed in Fig. 2, gears 29 and 31 are caused to roll around gear 28 in a clockwise direction and each of the gears rotates about its own axis in a clockwise direction. Assuming that the gear 28 is held stationary, oil will be carried around by the teeth of gear 31 from conduit 44 and will be forced into conduit 43, thus causing a continuous circulation of oil in the oil circuit. Now, if the opening in conduit 43 is blocked, the oil therein will tend to be compressed by the action of the gears, but since the oil is incompressible it exerts a force against gears 28 and 31 which prevents rotation of these gears relative to each other. Upon further rotation of block 21, therefore, gear 28 will be forced to rotate therewith. If, however, the passage in conduit 43 is only partly closed, there will be some circulation of oil and gear 28 will be caused to rotate in the same direction as block 21 but at a lower velocity. By controlling the extent of restriction of passage 43, therefore, gear 28 can be caused to rotate at any velocity equal to or less than the velocity of block 21.

A similar conduit 46 is associated with planet gear 29 and is adapted to control the action of gear 28 relative to gear 29. Other conduits 47 and 48 extend to the planet gears 23 and 24 of the other epicyclic gear train. The fluid conduits extend thru block 21 and thru an extension block 49 rigidly secured on block 21 to a sleeve valve 51 which is adapted to control all of the passages simultaneously. Valve 51 has a sliding fit about sleeve 32 and is capable of longitudinal movement and rotational movement relative to sleeve 32. The outer surface of valve 51 is provided with a plurality of keys 52 which are slidably disposed within a plurality of splines 53 in block 49 so that valve 51 can be moved longitudinally relative to block 49, but is prevented from rotating with respect to block 49.

Attention is now directed to Fig. 7 in which I have shown diagrammatically one arrangement of the fluid conduits relative to the other parts of the transmission. Valve 51 is provided with a pair of gates 54 which control the fluid which is adapted to restrain the epicyclic gear train of which gear 22 is the sun gear and a pair of similar gates 56 for controlling the fluid acting upon the other epicyclic gear train. Valve 51, in the position shown, allows circulation of the fluid through the epicyclic gear train of which gear 28 is the sun gear and the path of the fluid, assuming that gears 29 and 31 are rotating in a clockwise direction, may be traced from conduit 44, around gear 31, thru conduit 43, thru one of the gates 56 in valve 51, conduit 57, around gear 29, conduit 46, thru the other gate 56 and back to conduit 44. It will be noticed that the path just traced is controlled by two valve gates 56 and that the same fluid controls the restraint on both gears 29 and 31.

A similar path can be provided to control the restraint on the other epicyclic gear train, but for the purpose of illustrating an alternative arrangement, I have shown separate fluid paths for controlling each of the gears 23 and 24. The fluid path controlling gear 23 can be traced from one of the gates 54, thru conduit 47, around gear 23, thru conduit 58 back to gate 54. This path is shown obstructed at gate 54. The fluid path controlling gear 24 can be traced from the other gate 54, thru conduit 48, around gear 24, thru conduit 59 back to gate 54 and this path is also obstructed at its associated gate 54.

When valve 51 is in the position shown in Fig. 7, planet gears 29 and 31 are free to roll about gear 28, but rolling movement of planet gears 23 and 24 about gear 22 is restricted by the obstructed fluid path leading to gears 23 and 24. Gear 22, therefore, is constrained to rotate and the motion imparted to shaft 17 will be the result of the rotation of gear 22.

Gates 54 and gates 56 are preferably so disposed on valve 51 that their action is complementary relative to each other, that is, when gates 54 begin to open their associated fluid paths, gates 56 begin to obstruct the paths associated with gates 56 and the paths controlled by gates 56 become entirely obstructed when the paths controlled by gate 54 become completely opened. Therefore, if valve 51 is moved to the right, as viewed in Fig. 7, the fluid conduits controlling gear 28 will at first be obstructed a slight amount thereby causing the counterclockwise rotation of gear 28 to decrease and at the same time the fluid conduits controlling gear 22 will be opened slightly, thereby causing the clockwise rotation of gear 22 to decrease by a correspondingly slight amount. The motion imparted to shaft 17 will be the resultant effect of the rotational movement of both gears 22 and 28. As valve 51 is moved further to the right the counterclockwise rotation of gear 28 and the clockwise rotation of gear 22 will be further decreased. Eventually, as valve 51 is moved still further to the right the effect of gear 28 on the rotation of shaft 17 will be equal and opposite to the effect of gear 22 and both gears 22 and 28 and shaft 17 will be stationary. Now, as valve 51 is moved still further to the right, gear 28 will be caused to rotate in a clockwise direction and gear 22 will be caused to rotate in a counter clockwise direction and shaft 17 will, therefore, rotate in a counterclockwise direction. At the limiting position of valve 51 toward the right shaft 17 will rotate at its maximum velocity in a counterclockwise direction. Thus, it will be seen that shaft 17 can be caused to rotate in either direction and at all intermediate values merely by shifting valve 51 to the right or to the left.

For actuating or shifting valve 51, a lever 61 is provided which is pivoted about a pin 62 and which extends outside of housing 18. One end of lever 61 is provided with a yoke 63 having projections thereon which extend into a groove 64 formed on valve 51. By swinging lever 61 about pivot 62 valve 51 is caused to slide longitudinally on sleeve 32 and thereby vary the relative position of the gates in valve 51 relative to the fluid conduits. If desired, any suitable means, such as friction means, can be provided for maintaining lever 61 in any one of its adjusted positions.

Normally housing 18 is completely filled or substantially filled with a suitable oil which serves to lubricate the gears as well as to maintain a constant supply of fluid in the conduits which control the epicyclic gear trains. In order that oil will not escape from the opening thru which lever 61 extends, a fluid-tight joint 66 of any suitable type is provided between lever 61 and housing 18. The left hand side of housing 18, as viewed in Fig. 1, is adapted to be covered by a suitable fluid-tight plate or by securing housing 18 to some part of the machine in which the transmission is to be used, such as the crankcase of an automobile.

As block 21 rotates, oil in housing 18 is constantly splashed against the upper side of housing 18 and an oil scoop 67 is secured to the interior of housing 18 and is disposed adjacent the periphery of block 21 to catch this oil and deliver it into a conduit 68. Conduit 68 communicates with the interior of a conical cover plate 69 disposed over the end of block 49. When block 49 rotates, oil is carried by centrifugal action to all parts of the chamber formed between the block 49 and the conical cover 69 and this chamber is at all times substantially full of oil, even when the oil in housing 18 falls to a relatively low level.

Each of the fluid conduits in block 21 has a branch opening into the interior of the chamber formed by cover 69 and automatic oneway valves are provided at the ends of these branches. An automatic valve, suitable for this purpose, is shown in detail in Fig. 6 and comprises a ball 71 pressed by a spring 72 against a seat 73 which controls the branch passage to the oil filled chamber. By employing a valve of this construction, oil can be drawn inwardly into the conduits which control the epicyclic gear trains, but none is permitted to pass outwardly thru these valves. Thus, oil is automatically delivered to the conduits to replenish the supply therein whenever required.

When my transmission is employed on an automobile, the customary clutch can be dispensed with, since shaft 17 can be held stationary merely by sliding valve 51 to the proper position. Shaft 16 can be connected directly to the crankshaft of the automobile engine and a starter gear can be secured on shaft 16 or disposed about block 21 which meshes with a gear of a starter motor of any suitable type. When valve 51 is in that position which causes shaft 17 to remain stationary, shaft 16 can be rotated to start the motor without transmitting any motion of shaft 17. While a clutch is not essential, however, one can be provided if desired without departing from the spirit of this invention.

In Figs. 8 to 10 I have shown a modification of the valves controlling the fluid content and of the actuating mechanism therefor. In this modification a separate valve is employed to control each fluid conduit, there being four of such valves. The valves are arranged in pairs and the actuating mechanism is adapted to actuate all of the valves simultaneously, the valves in each pair being operable together and the operation of each pair of valves being complementary to the operation of the other, so that one pair of valves opens the associated fluid conduits as the other pair closes the other fluid conduits. Thus, I have shown a pair of valves 77 and 78 having gates 79 and 81 respectively. Valve 77 is slidable and the gate 79 therein is adapted to be moved to and from openings 83 in one of the fluid conduits and valve 78 is slidable in a similar manner to control openings 84 in one of the other fluid conduits.

Links 86 and 87 connect valves 77 and 78, respectively, to a sleeve 88 which is slidably disposed over sleeve 32. As sleeve 88 is moved to the left, as viewed in Fig. 9, valves 77 and 78 are moved in directions away from each other, and as sleeve 88 is moved toward the right valves 77 and 78 move in the opposite direction, or toward each other. During this movement of the valves 77 and 78, their respective fluid conduits are opened together, or are closed together, as the case may be. A pair of similar valves 91 and 92 connected by means of links 93 and 94, respectively, to a sleeve 96 slidably disposed over sleeve 88, controls fluid conduits 97 and 98 in a similar manner in response to movement of sleeve 96.

For actuating sleeve 88 a lever 99 is provided which is pivoted about a pin 101. A yoke 102 is formed on one end of lever 99 which engages a groove 103 in sleeve 88. By swinging lever 99 about pivot pin 101, sleeve 88 can be moved to the right or to the left to open or close valves 77 and 78. For actuating sleeve 96, a second lever 104 is provided which is also pivoted about pin 101 and this lever has a yoke 106 which engages a groove 107 in sleeve 96.

For actuating levers 99 and 104 so that one set of valves opens while the other closes, a pair of cam members 108 and 109 are provided which are secured to a shaft 110 journaled for rotational movement in bearings 111 and 112. Cam member 108 has a suitable cam race 113 formed therein which engages a pin 114 extending from lever 99. Cam member 109 is provided with a similar cam race 116 which engages a pin 117 extending from lever 104, the cam race 116, however, being oppositely disposed relative to cam race 113 on cam member 108. When shaft 110 is rotated, cam members 108 and 109 rotate therewith and cam member 108 causes valves 77 and 78 to be moved in one direction while cam member 109 causes valves 91 and 92 to be moved in the opposite direction, so that one set of fluid conduits is being opened while the other set of fluid conduits is being closed. Any suitable means, such as a lever 118, can be provided for imparting rotational movement to shaft 110. A cover plate 119 can be provided for the valves which has a function corresponding to that of cover plate 69 described in connection with the other embodiment.

While I have referred to automobiles in the description of my transmission, it is to be understood that the transmission is not limited to use on automobiles nor is it limited to use on motive devices generally since it can be adapted to a wide variety of uses. Although I have shown and described certain preferred embodiments of my invention, I do not wish to be limited thereto, since the invention as defined in the appended claims can be embodied in a plurality of other forms.

I claim:

1. A transmission comprising a driving element including a housing, a driven element, a pair of hydraulic displacement gear trains interposed between said elements, and located in and driven by said housing, each of said gear trains affording a different speed ratio between the elements, a unit in one of said gear trains positively coupled to said driven element, and a hydraulically retarded unit in each of said gear trains serving to control the combined coupling effect of both gear trains.

2. A transmission comprising a driving element including a housing, a driven element, a pair of hydraulic displacement gear trains interposed between said elements and located in and driven by said housing, each of said gear trains affording a different speed ratio between the elements, a unit in one of said gear trains positively coupled to said driven element, a unit in each of said gear trains adapted to be retarded to control the combined coupling effect of both of said gear trains and means for retarding each of said units.

3. A transmission comprising a driving element including a housing, a driven element, a pair of hydraulic displacement gear trains interposed between said elements, and located in and driven by said housing, each of said gear trains affording a different speed ratio between the elements, a unit in one of said gear trains positively coupled to said driven element, a unit in each of said gear trains adapted to be retarded to control the combined coupling effect of both of said gear trains, hydraulic means for retarding each of said units and means for varying the retarding effect of said hydraulic means.

4. A transmission comprising a driving element including a housing, a driven element, a pair of hydraulic displacement gear trains interposed between said elements and located in and driven by said housing, each of said gear trains affording a different speed ratio between the elements, a gear in one of said gear trains positively coupled to said driven element, a gear in each of said gear trains adapted to be retarded to change the resultant coupling effect of both of said gear trains and hydraulic means adapted to be displaced by each of said retardable gears and serving to retard said gears.

5. A transmission comprising a driving element including a housing, a driven element, a pair of hydraulic displacement gear trains interposed between said elements and located in and driven by said housing, each of said gear trains affording a different speed ration between the elements, a gear in each of said gear trains adapted to be retarded to change the resultant coupling effect of both of said gear trains, a gear in one of said gear trains positively coupled to said driven element, hydraulic means adapted to be displaced by each of said retardable gears and serving to retard said gears, and means for varying the displacement of said hydraulic means whereby the speed ratio between said elements is varied accordingly.

6. A transmission comprising a driving element including a housing, a driven element, a pair of epicyclic hydraulic displacement gear trains interconnecting said elements and located in and driven by said housing, each of said epicylic gear trains affording a different speed ratio between the elements, a gear in one of said gear trains positively coupled to said driven element, a hydraulic displacement unit in each of said gear trains capable when restricted of retarding its associated gear train and means for restricting said units.

7. A transmission comprising a driving element including a housing, a driven element, a pair of epicyclic hydraulic displacement gear trains interconnecting said elements and located in and driven by said housing, each of said epicylic gear trains affording a different speed ratio between the elements, a gear in one of said gear trains positively coupled to said driven element, a hydraulic displacement unit in each of said gear trains capable when restricted of retarding its associated gear train, means for restricting said unit and means for varying the restricting means whereby the resultant coupling effect of both of said gear trains can be varied.

8. A transmission comprising a driving element including a housing, a driven element, a pair of gear trains interposed between said elements and located in and driven by said housing, one of said gear trains being rotated by the driving element in one direction and the other of said gear trains being rotated by the driving element in the reverse direction, a unit in one of said gear trains positively coupled to said driven elements and a hydraulically retarded unit in each of said gear trans serving to control the resultant coupling effect of both gear trains.

9. A transmission comprising a driving element including a housing, a driven element, a pair of epicyclic gear trains interposed between said elements and located in and driven by said housing, one of said epicyclic gear trains being rotated by the driving element in one direction and the other of said epicyclic gear trains being rotated by the driving element in the reverse direction a unit in one of said gear trains positively coupled to said driven elements and a hydraulically retarded unit in each of said epicyclic gear trains serving to control the resultant coupling effect of both gear trains.

In testimony whereof, I have hereunto set my hand.

HOWARD W. LEWIS.